(12) United States Patent
Emaci et al.

(10) Patent No.: US 6,483,436 B1
(45) Date of Patent: Nov. 19, 2002

(54) METHOD AND APPARATUS FOR SENSING SKEWS AND DISCONNECTS OF ADJACENT MOVABLE COMPONENTS

(75) Inventors: Edward Emaci, Rockford, IL (US); Scott Wilkinson, German Valley, IL (US); William Leden, Roscoe, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 37 days.

(21) Appl. No.: 09/862,066

(22) Filed: May 21, 2001

(51) Int. Cl.⁷ .............................................. G08B 21/00
(52) U.S. Cl. ................. 340/686.1; 340/945; 340/868.2; 340/686.3; 340/687; 340/689; 335/205; 335/206; 335/207; 324/207.13; 244/213; 244/194; 244/215; 244/203; 701/14; 701/15; 701/16
(58) Field of Search .............................. 340/686.1, 945, 340/686.2, 686.3, 687, 689; 335/205, 206, 207; 324/207.13; 244/213, 194, 215, 203; 701/14, 15, 16

(56) References Cited

U.S. PATENT DOCUMENTS

| | | | |
|---|---|---|---|
| 3,964,318 A | | 6/1976 | Shutt .......................... 74/471 R |
| 4,181,276 A | | 1/1980 | Kogure et al. ................ 244/215 |
| 4,248,105 A | | 2/1981 | Downing et al. ........... 74/710.5 |
| 4,256,277 A | * | 3/1981 | Embree ....................... 244/213 |
| 4,720,066 A | * | 1/1988 | Renken et al. ............... 244/213 |
| 4,789,119 A | * | 12/1988 | Bellego et al. .............. 244/226 |
| 5,680,124 A | | 10/1997 | Bedell et al. ................ 340/945 |
| 5,686,907 A | | 11/1997 | Bedell et al. ................ 340/945 |
| 6,007,267 A | | 12/1999 | VanHorn ......................... 403/2 |
| 6,299,108 B1 | * | 10/2001 | Lindstrom et al. ........... 244/213 |

* cited by examiner

Primary Examiner—Jeffery Hofsass
Assistant Examiner—Tai T. Nguyen
(74) Attorney, Agent, or Firm—Hamilton Sundstrand Corporation

(57) ABSTRACT

A sensor detects skewed adjacent movable component. The sensor may be used to detect harmful skews of aircraft control surfaces, such as slats or flaps on aircraft wings, which may be caused by an actuator disconnection from the surface it drives. Harmful skew, which is a relative asymmetrical motion of control surfaces beyond a predetermined limit, is detected by the sensor, but the relatively smaller harmless skew caused by normal flight is ignored. The sensor comprises first and second arms connected to a common base that may be attached to a first control surface. A constraining means such as a mechanical fuse holds the arms together while a separating means such as a spring exerts a separating force on the arms when the fuse breaks. A switching means is integral to the two arms. A striker pin on a second control surface strikes the first or second sensor arm when the relative motion between the control surfaces exceeds a certain predetermined limit. The force of the striker pin breaks the constraining means at a predetermined tension. Then the switching means operates to provide an indication that the arms have been opened.

16 Claims, 6 Drawing Sheets

METHOD AND APPARATUS FOR SENSING SKEWS AND DISCONNECTS OF ADJACENT MOVABLE COMPONENTS

FIELD OF THE INVENTION

The invention relates generally to a sensor for detecting skewed or disconnected adjacent movable components, and more particularly to a sensor for detecting skewed or disconnected aircraft control surfaces such as slats or flaps while ignoring relatively smaller harmless skews caused by normal flight.

BACKGROUND OF THE INVENTION

Aircraft wings employ high-lift devices that are sometimes known as auxiliary airfoils or control surfaces. During takeoff and landing of the aircraft, the pilot can extend these control surfaces from a leading or a trailing edge of a wing to increase aerodynamic lift. When extended, the surfaces increase the effective size, curvature, camber, and area of the wing. This extension increases the lift of the wing for slow-speed flight. Control surfaces that extend from the leading edge of the wing are usually known as slats, while those that extend from the trailing edge of the wing are known as flaps. Slats are used primarily to increase lift at large angles of attack, while flaps are designed primarily to increase lift during landing.

An actuation system for the control surfaces converts electrical or hydraulic power, depending on the aircraft, into mechanical force that extends or retracts the control surfaces. Typically, a single lever in the cockpit controls both the slats and the flaps. In various aircraft designs, single or multiple actuators have driven a single control surface. Most frequently, multiple separate but coordinated actuators are used on each control surface, one or more on the inboard side, and one or more on the outboard side of the surface.

A control surface actuator is typically a geared device contained in the wing driven by hydraulics or by an electric motor. The actuator moves a rigid spar called a "track" that in turn extends or retracts the control surface. An actuation system may fail, for example, if the actuator gears strip, if the spar becomes disconnected from either the control surface or the actuator, or if the motive power (electric or hydraulic) is interrupted to the actuator. An actuation system problem is called "dormant" when it is not readily detected by inspection during ground maintenance, but fails later in flight. A dormant problem is a latent failure.

When two independent actuators drive a single control surface, only limited asymmetrical movement of the leading or trailing edge, respectively, of a slat or flap that is not parallel to the leading or trailing edge of the wing, respectively, will be tolerated. Such misaligned movement is called "skew." If one of the actuators fails, skew of the surface that the actuator drives may occur. This skew may jam a control surface mechanism, thereby restricting control of the aircraft. A surface may jam if the forces on it are asymmetrical, just as a drawer in an ordinary dresser may jam if it is pulled on one side. In the worst case, if both actuators driving the same surface fail, the surface may separate from the wing and be lost.

A single actuator, supporting structure, and track may instead actuate a control surface. However, this method does not supply the desirable redundancy that multiple actuators afford. Multiple actuators, either of which will support the control surface, but not necessarily drive it alone, provide a margin of safety. Use of multiple actuators, however, requires synchronization, which requires additional complexity. In addition, the control surface must be structurally capable of withstanding the force of a failed single actuator while the remaining actuator or actuators apply force. With multiple actuators, weight must be still be kept at a minimum.

In one prior art method, a taut cable running the length of a wing detected skew of control surfaces. The cable sensed all control surfaces on the wing simultaneously when tension changes in the cable were measured. This method suffered from being relatively less sensitive to skew, and it was less capable of detecting which surface of several was skewed. Inductive proximity switches on control surface tracks have also been used for skew detection. The switches monitored track position and compared it with driveline position at the end of the wing. The proximity switch method suffered because the switches give an "on" or "off" reading rather than a continuous output. For example, U.S. Pat. No. 5,686,907 to Bedell, et al. discloses a system that used both the cable and proximity switch methods. Such systems were in some cases not sensitive enough for regional jet applications.

Regional or business jets typically use low-profile, relatively small wings with smaller slats and flaps as compared with larger commercial aircraft that typically use larger, high-profile wings. Manufacturing and assembly tolerances, thermal conditions, wing dynamics, and backlash on the slats together result in stringent requirements on a sensing system. That is, a small 'window' exists where sensing must take place. The sensor cannot be so sensitive as to create a false detection due to assembly tolerances, temperature, wing dynamics, and backlash that cause a relatively small amount of harmless skew. On the other hand, it must detect relatively larger amount of harmful skew on surfaces.

DISCLOSURE OF THE INVENTION

Accordingly, it is an object of this invention to provide a sensor that will detect harmful skew in any configuration having adjacent movable components.

Another object is to provide a sensor that will detect a failed aircraft control surface actuator or a broken connection between an actuator and the surface it operates.

It is a further object to detect an actuation system failure that may cause harmful skew or separation of an aircraft control surface from a wing while ignoring the relatively smaller harmless skew caused by assembly tolerances, temperature, wing dynamics, and backlash.

Another object is to provide a sensor that will detect harmful skew of a control surface and activate a circuit to warn the crew.

Still another object is to provide a sensor that will detect a lost control surface and activate a circuit to warn the crew.

Yet another object is to provide a sensor that is capable of de-energizing an actuation system to reduce aircraft damage after the sensor detects harmful skew or loss of a control surface.

Another object is to provide a sensor whose state can be determined by visible inspection during maintenance.

A further object is to provide a sensor that is repairable, re-settable, accurate, and reliable.

An additional object is to provide a sensor that will resist salt, insects, dirt, and other contaminants in an aircraft environment.

A major step in the invention is the recognition that a constraining means such as a mechanical fuse that separates at a predetermined tension, combined with a switching means, may be used to detect harmful skew of two adjacent movable components that exceeds a predetermined limit, while ignoring relatively small harmless motions.

According to the invention, a sensor that detects relative motion of two adjacent movable components comprises a base; a first arm pivotally connected to the base; a second arm pivotally connected to the base; a switching means integral with the first and second arms for detecting the position of the two arms with respect to each other; separating means for applying a force between the first and second arms; and means for simultaneously constraining the first and second arms in a closed position and the switching means in a closed position until a relative motion between the two adjacent movable components exceeds a predetermined limit, thereby causing a force on the first or second arm to exceed a predetermined limit, which causes the constraining means to release the arms from the closed position and also causes the separating means to apply a force to the first and second arms to move the first and second arms to an open position and to move the switching means to an open position.

In further accord with an aspect of the present invention, the switching means is operative to provide an indication that the first and second arms are in the closed or opened position, wherein the indication may be visual or may comprise a signal of an electrical, optical or some other nature that may be used by subsequent circuitry.

The invention has several benefits compared with prior art systems such as U.S. Pat. No. 5,686,907 to Bedell, et al. The present invention is more sensitive to the motion of adjacent movable components, in particular control surfaces, and it is better able to detect dormant problems before they become failures. In addition, the invention better protects against a false annunciation to the crew of a harmful control surface skew. It is also lighter than the prior art. The sensor of the present invention is re-settable by replacing or re-setting the means for constraining the arms. Finally, after an actuation of the sensor, it is simple to establish during ground maintenance where a failure occurred since there is physical evidence of a broken fuse or other means for constraining the arms.

The above and other objects, features, and advantages of this invention will become apparent when the following description is read in conjunction with the accompanying drawings.

DETAILED DESCRIPTION OF THE PREFERRED EMBODIMENTS

Figure 1:
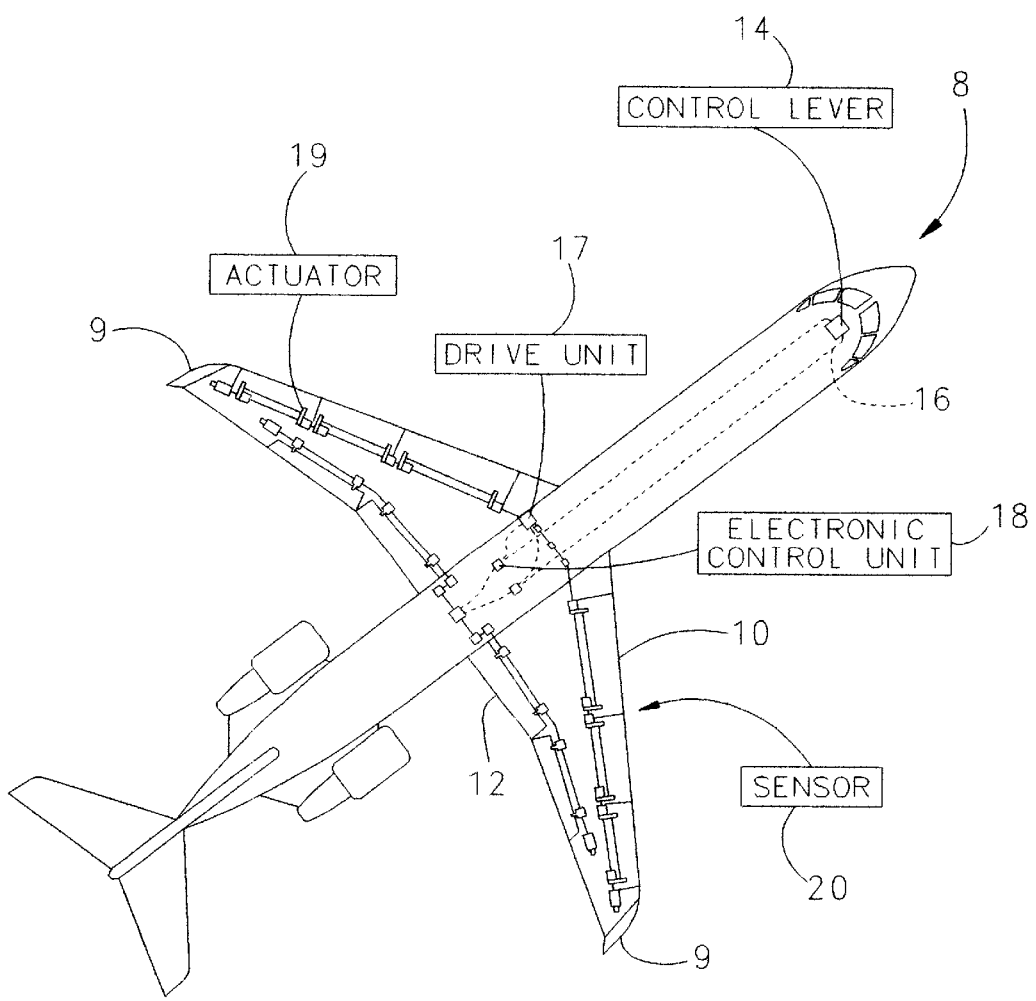
FIG. 1 is a top view of a typical aircraft showing wing control surfaces and associated devices.

Referring to FIG. 1, a typical aircraft 8 has two wings 9, each having a plurality of slats 10 and flaps 12. A control lever 14 for the slats 10 and flaps 12 is located in the cockpit 16. A drive unit 17 controlled by an electronic control unit 18 transmits torque to a plurality of actuators 19, which may be used to drive slats 10 or flaps 12. A preferred exemplary embodiment of a sensor 20 of the present invention may be attached between adjacent slats 10 as described in detail hereinbelow.

Figure 2:
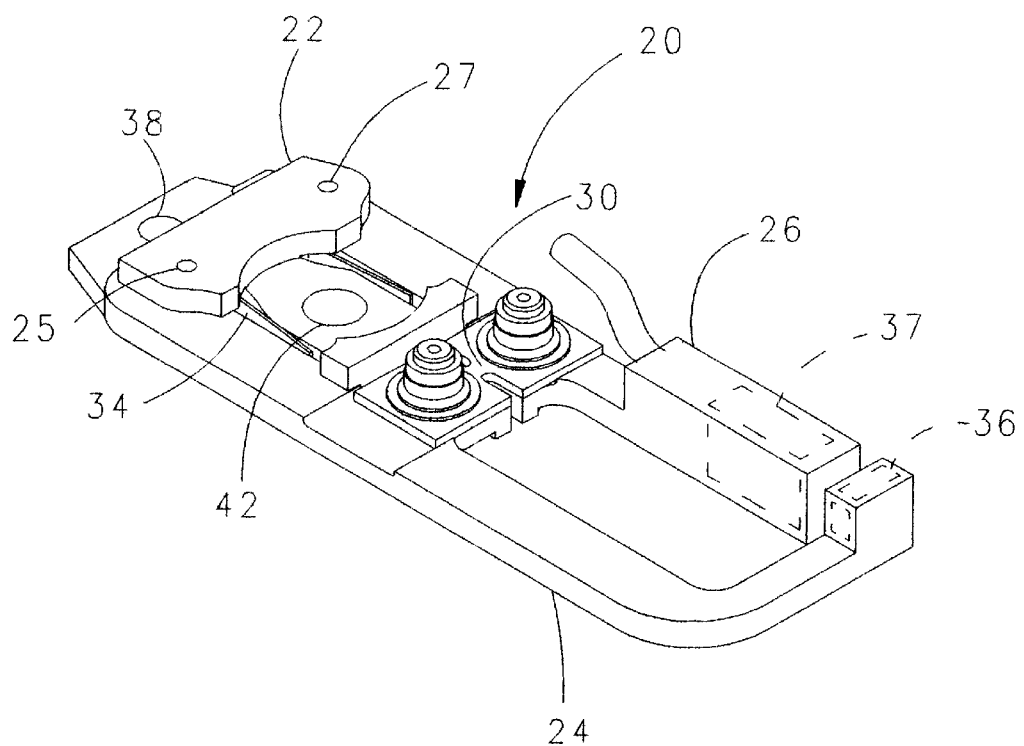
FIG. 2 is an isometric view of a sensor for wing control surfaces as shown in FIG. 1 in accordance with the present invention.

Referring now to FIG. 2, a preferred embodiment of the sensor 20 comprises a base 22, a first arm 24 pivotally connected to the base 22 with a first pin 25, a second arm 26 pivotally connected to the base 22 with a second pin 27, a mechanical fuse 30 that constrains the two arms together in a closed position, and a leaf spring 34 attached to the base 22 that helps to push the two arms apart into an open position when the mechanical fuse 30 breaks. In this embodiment, the mechanical fuse 30 comprises the constraining means. A "mechanical fuse" is a frangible element, that is, a device that severs a connection between two mechanical components when stress between the two components exceeds some pre-established amount. Shear pins, for example, may connect a propeller of an outboard motor to the drive shaft of the motor. If the propeller strikes an obstacle, the shear pin breaks before damage to the drive train of the motor occurs. Thus, the pin is "sheared" and the drive shaft can spin free without damage to the motor drive train. In the present invention, a mechanical fuse 30 disposed in a longitudinal direction, in the direction of pull, is used instead of a shear pin. The fuse breaks under tension, not under torque.

Figure 3:
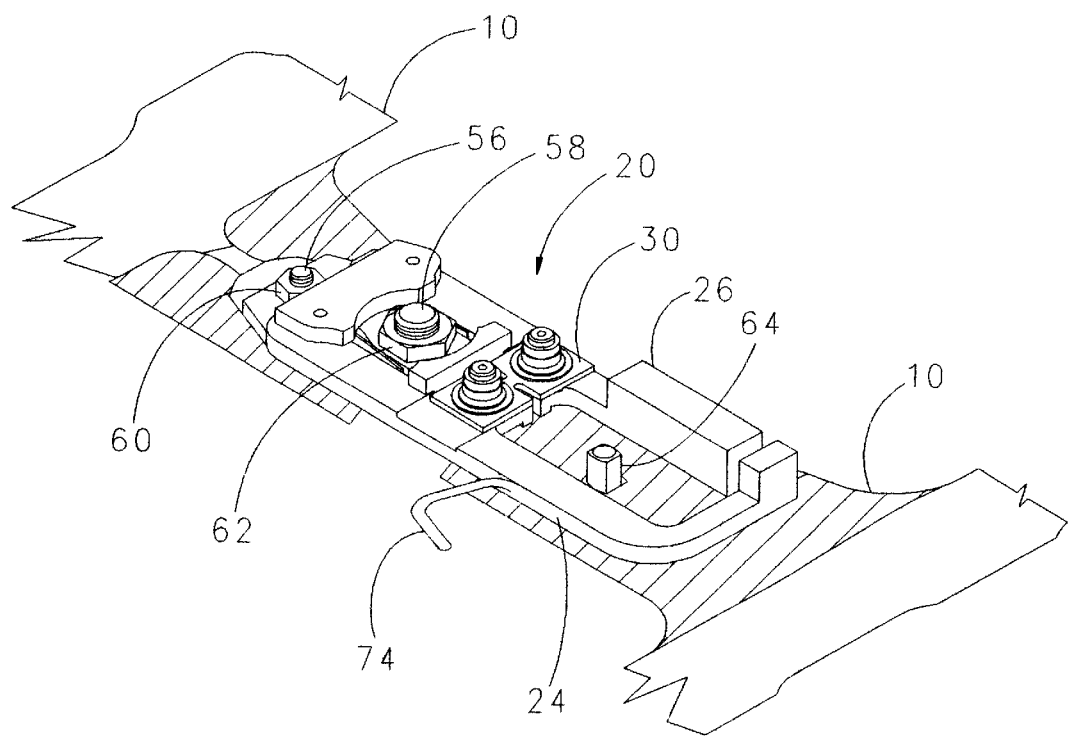
FIG. 3 is an isometric view of the sensor of FIG. 2 mounted on adjacent control surfaces.

Integral to the first arm 24 and second arm 26 is a switching means. In the sensor 20 the switching means comprises two parts: a permanent magnet 36 mounted in a recess at the end of the first arm 24 adjacent the tip of the second arm 26; and a reed switch 37 disposed at the tip of the second arm 26 adjacent the magnet 36. The reed switch 37, which is a known, reliable device, comprises thin, flexible contacts (reeds) enclosed in a vacuum tube. The tube protects the reeds from contaminants such as salt and insects that assail an aircraft. A circuit in the electronic control unit 18 may be closed when the magnet 36 external to the switch 37 attracts one of the reeds, which contacts the other reed. A first mounting hole 38 and a second mounting hole 42 are used to attach the sensor 20 to a control surface on an aircraft wing (FIG. 3). The magnet 36, the reed switch 37, and their interaction are illustrated and discussed in more detail hereinbelow.

In FIG. 3 is illustrated cutaway portions of two adjacent movable components. For example, these components may be adjacent aircraft control surfaces, more particularly, slats 10 on a wing 9, but the broadest form of the invention is not limited to this particular embodiment. The sensor 20 in this slat example may detect whether acceptable limits for slat skew are exceeded, as the following discussion sets forth. Relatively small aircraft have only one slat per wing, but larger aircraft have as many as six slats, each typically actuated by at least two hydraulic or electrically powered actuators.

Bolts 56,58 and nuts 60,62 rigidly attach the sensor 20 to one of the slats 10. A striker pin 64 is rigidly attached to the other adjacent slat 10. A structural tongue and groove (not shown) formed integral with the slats 10 may be used to support load during a slat harmful skew or a disconnection between actuator 19 and its slat. Under normal conditions, the striker pin 64 carries no load and the sensor 20 is in the switched "on" position. In this position, the constraining means (i.e., the mechanical fuse 30) is in a closed state, and, as such, it keeps the first and second arms 24,26 in the closed position. The fuse 30 being in the closed state also keeps the switching means in the closed position.

If the slat actuator 19 disconnects, for example, from slat 10, one slat end remains stationary with respect to the wing while the other end moves, possibly resulting in sufficient asymmetrical movement (i.e., a harmful skew) between the slats 10. As the skew increases, the clearance between one of the sensor arms 24, 26 and the striker pin 64 decreases. The sensor 20 ignores a harmless range of skewed motion of the striker pin 64 so long as the pin 64 stays within the space between the arms 24,26. With greater motion of striker pin 64, caused by harmful slat skew, the pin abuts one of the arms 24,26. Which arm 24,26 the pin 64 abuts depends upon the direction of asymmetrical movement or skew of one of the slats 10. Then, with further skew between the two slats 10, the striker pin 64 pushes the arms 24,26 apart. The mechanical fuse 30 then breaks within a predetermined tension range. The fuse 30 is then considered to be in the open state.

Because the fuse 30 in the closed state is the only force constraining the arms 24,26 together in the closed position during normal non-skewed operation, when the fuse 30 breaks, the arms separate. The separating means (i.e., the spring 34) then exerts a force that pushes the two arms 24,26 apart. The spring 34 also causes the switching means to physically separate such that the reed switch 37 and magnet 36 are physically separated from each other and in the open position. When the fuse 30 breaks, the arms 24,26 may be constrained at the base pivot area 22 to rotate to a predetermined angle, but this is not essential to the invention. When the switching means assumes the open position, the reed switch 37 transitions to "off", signaling a harmful skew fault. An electrical circuit (not shown) connected to a pair of wires in a cable 74 (FIG. 4) from the switch 37 senses the change in electrical continuity. This electrical signal may annunciate a warning in the cockpit 16. The electronic control unit 18 for the control surface may in addition be de-energized.

Figure 4:
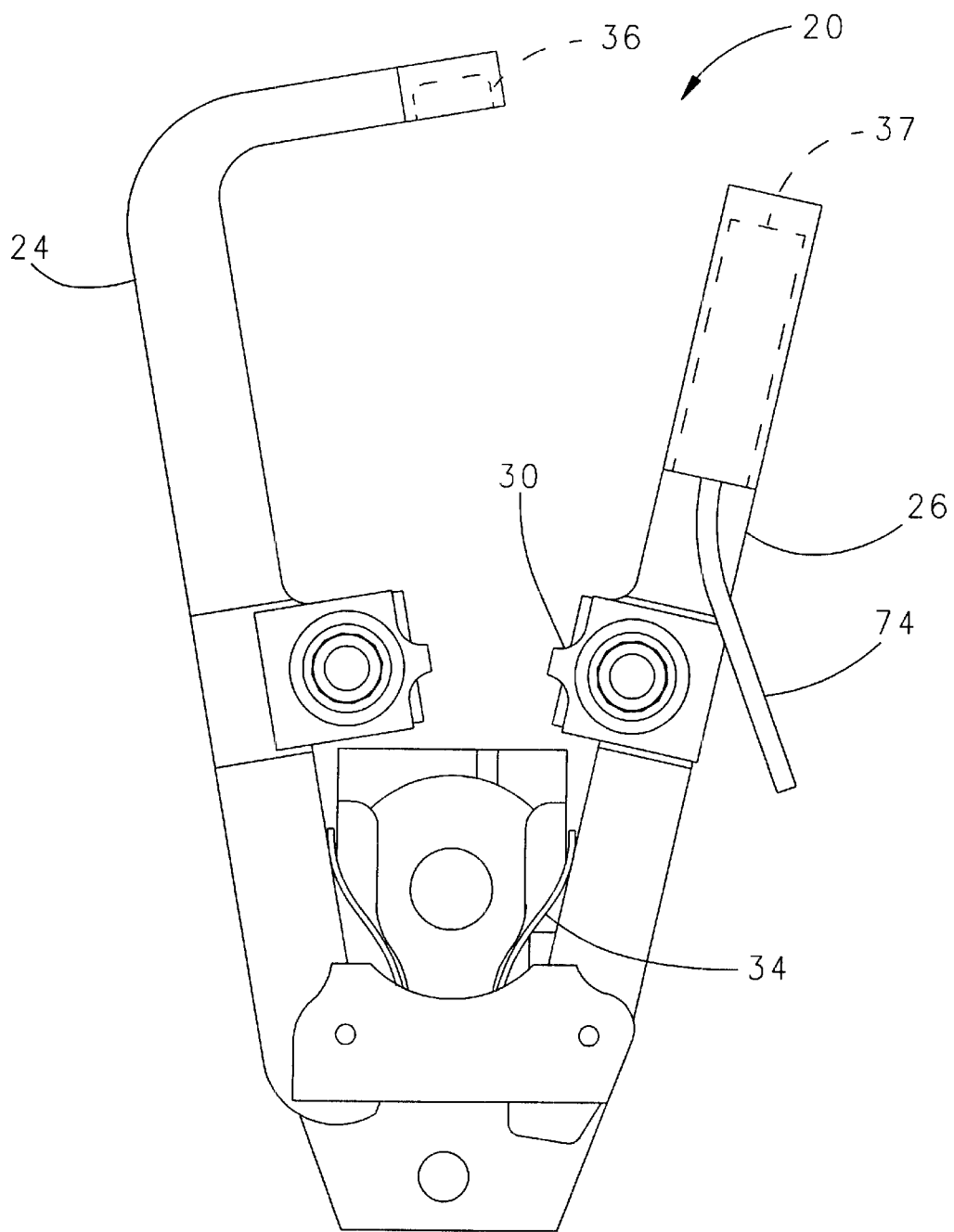
FIG. 4 is a top view of the sensor of FIG. 2 after the mechanical fuse has broken.

FIG. 4 shows the configuration of the sensor 20 after the fuse 30 has broken. Spring 34 has separated the arms 24,26. The permanent magnet 36, embedded in the tip of the arm 24, remains separate from the reed switch 37. When magnet 36 and reed switch 37 had been in proximity to each other before the fuse 30 broke, the magnetic force of the magnet 36 held the reed switch 37 in the "on" (closed) position. After the arms 24,26 have separated, the reed switch 37, in the absence of the magnetic field of the magnet 36, switches to "off" (open) position.

Figure 5:
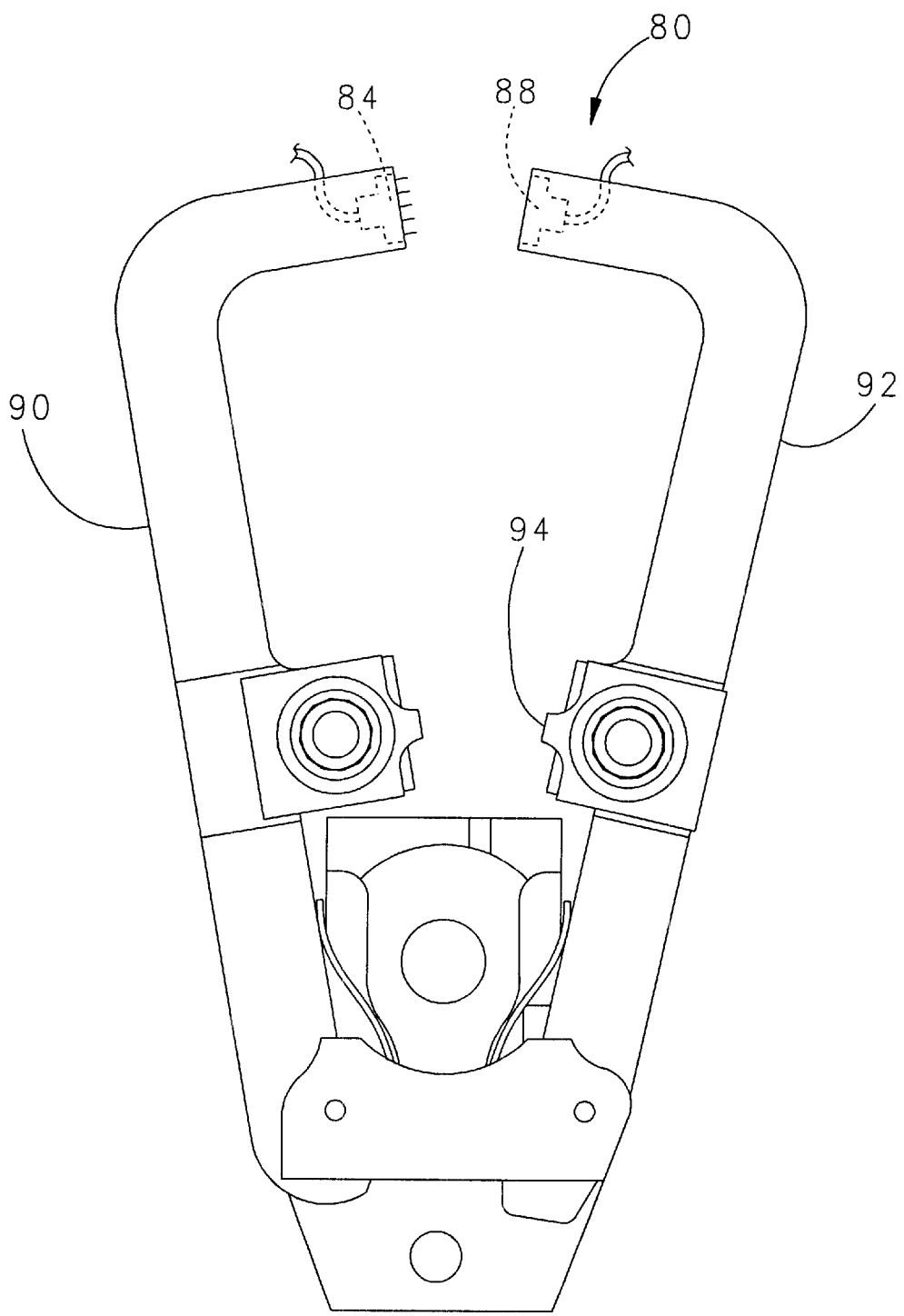
FIG. 5 is a top view of a second embodiment of the sensor of the invention after the mechanical fuse has broken.

FIG. 5 shows a second embodiment 80 of the invention. A reed switch and magnet are not used; instead, a male electrical connector 84 mates with a female electrical connector 88 when the arms 90,92 of the sensor 80 are constrained by the fuse 30 together in the closed position. When the fuse 94 breaks, the arms separate as depicted in FIG. 5. Connectors 84,88 break a circuit connection that may provide an indication that the arms have been opened. In particular, a signal may be sent to the electronic control unit 18. Although this embodiment has utility, the embodiment of FIGS. 1–3 is preferred in an aircraft environment because the reed switch is better protected from contaminants than the electrical connectors.

Figure 6:
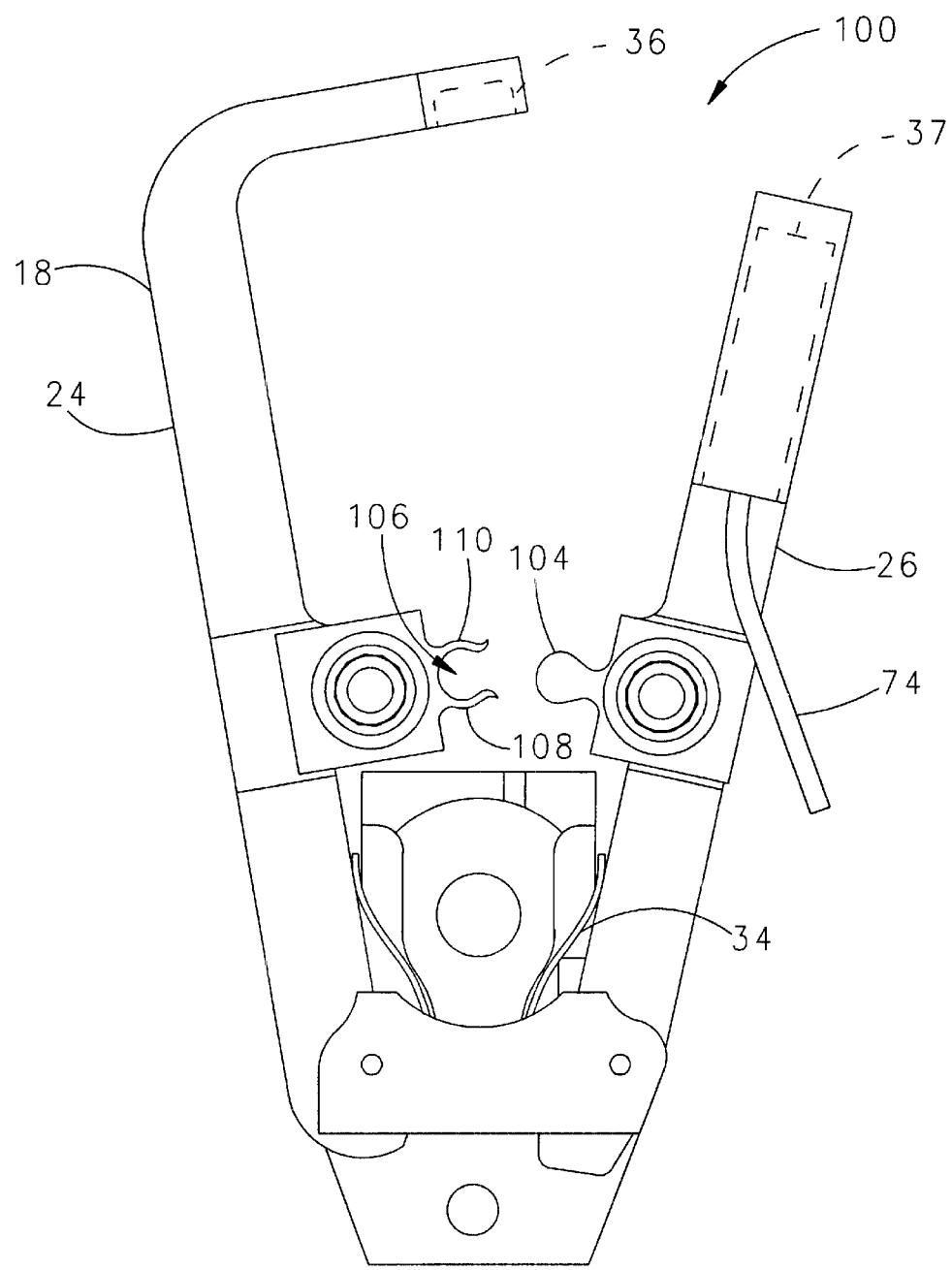
FIG. 6 is a top view of a third embodiment of the sensor of the invention after a key has separated from a latch.

In FIG. 6 is illustrated a third embodiment 100 that employs a male key 104 that mates with a female latch 106 as the constraining means instead of the mechanical fuse 30. The latch comprises two flexible jaws 108,110 that are held together by a relatively strong spring action. When the arms 24,26 of the sensor 100 are in the closed position, the key 104 mates with the latch 106. As with the other embodiments, a range of motion of the striker pin 64 is tolerated so long as it stays within the space between the arms 24,26. With greater skew, the pin 64 hits one of the arms. With further skew between the two slats 10, the male key 104 and female latch 106 separate within a predetermined tension range; the spring 34 then forces the arms 24,26 apart and also forces the switching means to the open position.

It may be understood by one with ordinary skill in the art that neither the constraining means nor the switching means of the invention are limited to the embodiments described hereinabove. For example, the constraining means may be a solenoid mounted on one arm combined with a coaxial ferrous core mounted on the other arm, such that a magnetic field attracts the core into the solenoid. In that embodiment, a signal may be derived from the solenoid when the arms are forced apart, so that the solenoid is also a switching means. In another embodiment, the switching means may be an infrared, electromagnetic, or acoustic sensor on one arm combined with an infrared, electromagnetic, or acoustic source on the other arm.

Further, the present invention may be used in applications other than as a slat harmful skew sensor. The motion of horizontal stabilizer surfaces on aircraft may also be sensed utilizing this invention, rather than using limit switch sensors now typically employed. The invention may also be used, for example, as a motion sensor to detect forced entry of a door or window, while ignoring small motions of the door or window in relation to a jam or frame, respectively. The invention may be made of various materials, and it may be made in any size. Any electrical circuit may connect with the switching means.

All of the foregoing changes are irrelevant. It suffices for the present invention that a sensor that detects relative motion of two adjacent movable components comprises a base; a first arm pivotally connected to the base; a second arm pivotally connected to the base; a switching means integral with the first and second arms for detecting the position of the two arms with respect to each other; separating means for applying a force between the first and second arms; and means for constraining the first and second arms and the switching means both in a closed position until a relative motion between the two adjacent movable components exceeds a predetermined limit, thereby causing a force on the first or second arm to exceed a predetermined limit, which causes the constraining means to release the arms from the closed position and also causes the separating means apply a force to the first and second arms to move the first and second arms to an open position and to move the switching means to an open position.

We claim:

1. A sensor for detecting relative motion for two adjacent components, comprising:

a base connected to one of the two components;

a first arm pivotally connected to the base;

a second arm pivotally connected to the base;

switching means integral with the first and second arms for detecting a position of the two arms with respect to each other;

means for constraining the first and second arms in a first position when the constraining means is in a closed state, the constraining means also comprising means for constraining the switching means to a first position when the constraining means is in the closed state; and means for separating the first and second arms into a second position when the constraining means is in an open state, wherein the separating means causes the switching means to assume a second position when the constraining means is in the open state, the constraining means being in the open state when the relative motion between the two adjacent components has exceeded a predetermined limit.

2. The sensor of claim 1, wherein the means for constraining is a mechanical fuse.

3. The sensor of claim 1, wherein the means for constraining is a key mating with a latch.

4. The sensor of claim 1, wherein the switching means is a combination of a reed switch and a magnet.

5. The sensor of claim 1, wherein the switching means is a combination of a male electrical connector disposed on the first arm and a female electrical connector disposed on the second arm, the female connector being in opposition to and in alignment with the male electrical connector.

6. The sensor of claim 1, wherein the switching means is the combination of a radiation sensor on the first arm and a radiation source on the second arm.

7. A method for sensing relative motion of first and second components, comprising the steps of:

providing a base connected to the first component;

providing first and second arms each pivotally connected to the base;

providing means for constraining the arms together in a first closed position;

causing the constraining means to open at a predetermined force applied to either of the first or second arms; and separating the arms into a second open position when the constraining means has opened.

8. The method of claim 7, further comprising the steps of: providing means for switching integral with the first and second arms, wherein the switching means is operable to detect a position of the two arms with respect to each other.

9. The method of claim 8, wherein the switching means is a combination of a reed switch and a magnet.

10. The method of claim 8, wherein the switching means is a combination of a male electrical connector disposed on the first arm and a female electrical connector disposed on the second arm, the female connector being in opposition to and alignment with the male electrical connector.

11. The method of claim 8, wherein the switching means is a combination of a radiation sensor disposed on the first arm and a radiation source disposed on the second arm.

12. The method of claim 7, further comprising the steps of:

providing a striker pin connected to the second component, the striker pin being disposed between the first and second arms; and causing the striker pin to strike one of the two arms when the relative motion of the first and second components with respect to each other exceeds a predetermined limit.

13. The method of claim 7, wherein the constraining means is a mechanical fuse.

14. The method of claim 7, wherein the constraining means is a key mating with a latch.

15. The method of claim 7, wherein the first and second components are adjacent aircraft control surfaces.

16. The sensor of claim 1, wherein the two adjacent components are adjacent aircraft control surfaces.

* * * * *